United States Patent

[11] 3,562,617

[72] Inventors Roger D. Meier
Menominee Falls;
Philip H. Rusch, Wauwatosa, Wis.
[21] Appl. No. 813,520
[22] Filed Apr. 4, 1969
[45] Patented Feb. 9, 1971
[73] Assignee Square D Company
Park Ridge, Ill.
a corporation of Michigan

[54] MALFUNCTION DETECTOR CIRCUIT FOR A SOLID STATE ELECTRIC MOTOR CONTROLLED VEHICLE
10 Claims, 1 Drawing Fig.

[52] U.S. Cl................................................... 318/341,
317/33
[51] Int. Cl..................................................... H02h 7/09
[50] Field of Search............................................ 317/33;
318/341

[56] References Cited
UNITED STATES PATENTS
| | | | |
|---|---|---|---|
| 3,373,316 | 3/1968 | Palmer.......................... | 317/33X |
| 3,419,757 | 12/1968 | Steen............................ | 317/33X |
| 3,444,453 | 5/1969 | Peterson....................... | 317/33 |
| 3,484,652 | 12/1969 | Thiele........................... | 317/33 |

Primary Examiner—Oris L. Rader
Assistant Examiner—Thomas Langer
Attorneys—Harold J. Rathbun and William H. Schmeling ABSTRACT: A control circuit for a battery powered vehicle including circuits for detecting the failure of a pair of contacts in a high-speed circuit to open, the failure of a silicon controlled rectifier which supplies current pulses to the traction motor to switch to a nonconductive state within a predetermined time interval and the failure of a silicon controlled rectifier in a circuit that controls the direction of rotation of the motor to block current flow through the direction controlling circuit. The circuit is arranged to interrupt or prevent energization of the traction motor when any of the above recited failures is detected.

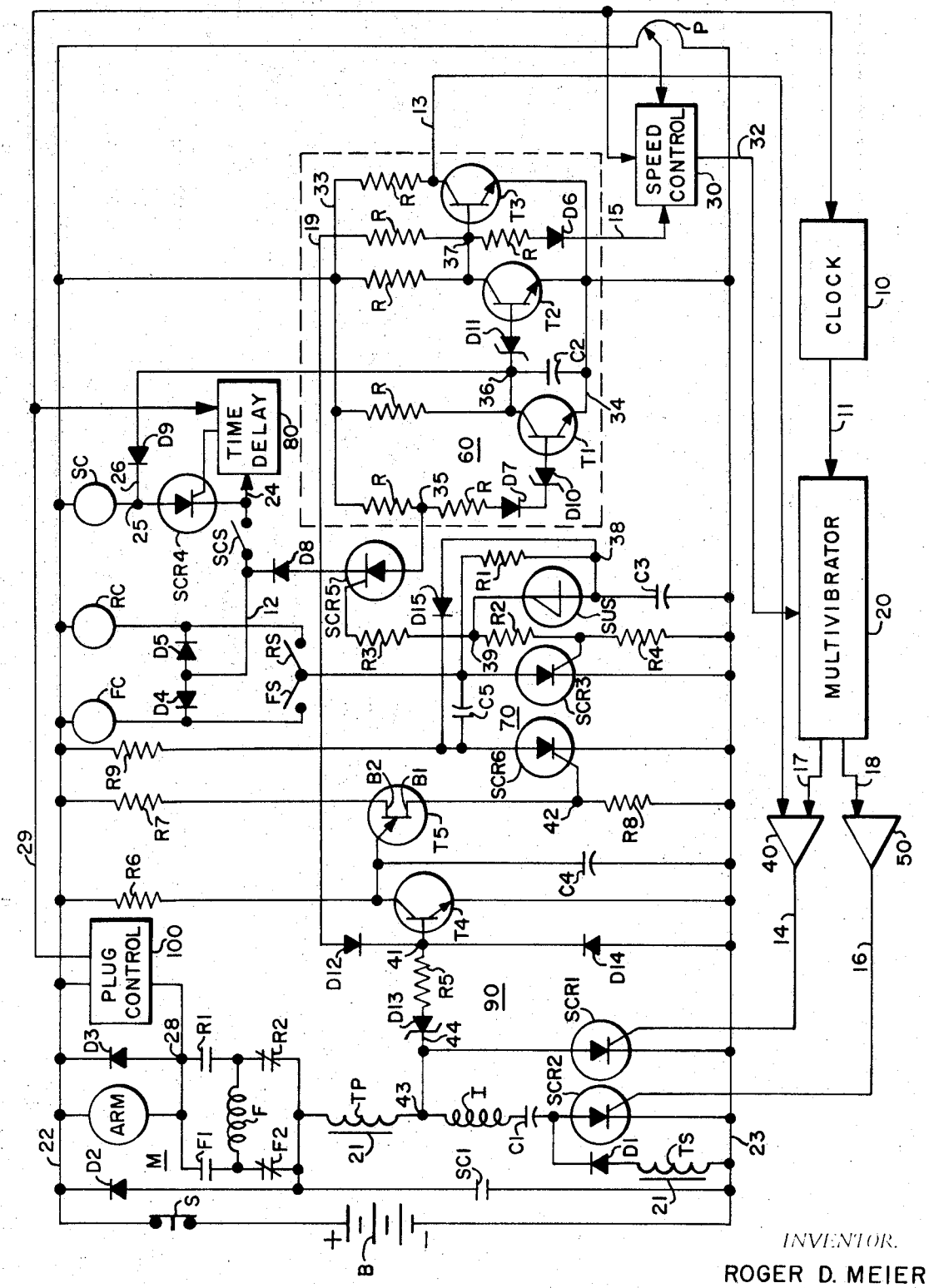

3,562,617

MALFUNCTION DETECTOR CIRCUIT FOR A SOLID STATE ELECTRIC MOTOR CONTROLLED VEHICLE

The present invention relates to a failure detector circuit for a solid state direct current motor control circuit for an electric vehicle and is more particularly concerned with a circuit which will prevent energization of the traction motor in an electric vehicle in event certain critical components of the motor control circuit are incapable of interrupting current flow through a circuit.

Electrically powered vehicles, such as battery operated trucks used in warehouses, are frequently provided with solid state-type controls using silicon controlled rectifiers. A motor control circuit, as shown in a U.S. Pat. Montross et al. No. 3,361,921,is typical of an apparatus that may be involved. In control circuits of the type herein contemplated, a main power controlling silicon controlled rectifier is switched to a conductive state at regulated spaced time intervals by an adjustable firing and timing circuit, and is switched to a nonconductive state a predetermined time interval after it is switched to a conductive state. The switching of the main rectifier to a nonconductive state is accomplished by a commutating silicon controlled rectifier which is controlled by a firing circuit to deliver a charge on a capacitor through the main rectifier in reverse to the conducting direction of the main rectifier to thereby commutate the main rectifier to its nonconductive state. While the circuit disclosed in the Montross et al. patent has been successfully used to control the operation of large size trucks which are capable of transporting heavy loads, a malfunction of the control may result in the delivery of full battery power to the motor when the control is initially activated. This will result in an abrupt start and uncontrolled acceleration of the truck until the truck operator regains control of the truck by manipulation of the master direction switch. Under many conditions a malfunction of this type will be without significance. However, under other situations, the malfunction may result in consequent damage to equipment and injury to personnel as may be envisioned when the truck is transporting a load consisting of sheets of plate glass, each having a size of more than 100square feet, which are stacked on the forks of the material-handling truck.

One type of failure of a silicon controlled rectifier is that the rectifier will fail in a conducting mode. When this type of failure occurs in a direct current motor circuit of a vehicle, the motor will be fully energized by uncontrolled power from the vehicle battery. Another type of failure which may be experienced is uncontrolled switching alternately between a conductive and nonconductive state of the rectifier which delivers the power current pulses to the traction motor. In this type of failure, the motor will be energized by power which greatly exceeds the power setting of the acceleration control of the vehicle in spite of the fact that the power delivering rectifier conduction is properly commutated by conduction of the turn-off silicon controlled rectifier in the control.

Other types of failure which may occur include the inability of the silicon controlled rectifier which controls the energization of the directional control contactors in the circuit to be switched to a nonconductive state or the failure of the contacts in a high-speed circuit for the motor to interrupt a circuit when the control circuit is adjusted to reduce the energization of the motor from a previously adjusted maximum. It is therefore an object of the present invention to provide a circuit in a solid state control circuit for an electric vehicle which will disconnect the motor from its power supply in event conditions prevail where control of the current flow to the motor is lost by the control circuit.

Another object is to provide a circuit in a control circuit for a battery operated vehicle which will interrupt the circuit to the motor when the rate of conduction of a silicon controlled rectifier exceeds a preselected value.

An additional object is to provide a solid state control circuit for a battery powered vehicle with detector circuits which will detect the failure of several components in the control circuit to interrupt the flow of current and to interrupt or prevent the energization of the traction motor for the vehicle when the failure of one of the components is detected.

A further object is to provide a solid state control circuit for a battery powered vehicle with detector circuits which will detect the following types of failures in the circuit: failure of the main silicon controlled rectifier which controls the energization of the motor to be switched to a nonconductive state within a preselected time interval, the inability of a silicon controlled rectifier which controls the energization of the directional controlling contactors in the circuit to remain in a nonconductive state and the failure of a set of contacts in a high speed circuit for the motor to interrupt a circuit when the control circuit is adjusted to reduce the energization of the motor from a previously adjusted maximum.

Further objects and features of the invention will be readily apparent to those skilled in the art from the specification and appended drawing illustrating a preferred embodiment, in which a schematic wiring diagram of a direct current motor control circuit incorporating the features of the present invention is shown.

The circuit shown in the drawing is particularly suited for controlling the energization of a series wound direct current motor M which serves as a prime mover for a vehicle having a directional and speed control master switch, not shown, which individually operates a pair of switch contacts FS and RS, as well as a slider on an adjustable resistor P. The switch contacts FS and RS control the energization of a pair of coil windings FC and RC of a pair of contactors which control the operation of two pairs of contacts F1—F2 and R1—R2 in a conventional reversing circuit for the motor M. During standby conditions, that is, prior to the operation of the master switch, a clock 10 provides signal pulses at a constant frequency through a lead 11 to a single shot-type multivibrator circuit 20. The multivibrator circuit 20 is controlled by the input signals from the clock 10 as well as a signal from a speed and acceleration control circuit 30 and supplies input signals to a pair of amplifiers 40 and 50 which in turn have outputs respectively providing firing current pulses to the gates of a pair of silicon controlled rectifiers SCR-1 and SCR-2 to switch the rectifiers SCR-1 and SCR-2 into conductive states. Further, during standby conditions, as the contacts F1, R1, FS and RS are open, the following conditions prevail within the circuit. The open contacts F1 and R1 prevent an armature winding ARM and a field winding F of the motor M from being energized and the rectifiers SCR-1 and SCR-2 from conducting. The open switch contacts FS and RS prevent the coil windings FC and RC from being energized and a silicon controlled rectifier SCR-3 from conducting. The open switch contacts FS and RS also cause a control signal to be supplied through a lead 12 to a circuit within a sequencing circuit 60 so that the sequencing circuit 60 supplies a blocking signal through a lead 13 to the amplifier 40 which prevents firing signals from appearing at a lead 14 which would switch the rectifier SCR-1 to a conductive state.

The armature ARM is caused to rotate in either the forward or reverse direction by the selective operation of the switch contacts FS or RS which are controlled by the master switch. Assuming the switch contacts FS are closed to operate the motor M in a forward direction, the following conditions will prevail. The switch contacts FS when closed complete a circuit through a coil winding FC to the anode of the rectifier SCR-3 and an energizing circuit to the time delay circuit 70 which, after a fixed time delay, e.g., 50milliseconds, supplies a signal to the gate of the rectifier SCR-3 which causes the rectifier SCR-3 to switch to a conductive state and become latched in a conductive state as it is connected through a pair of leads 22 and 23 across a direct current supply as provided by a battery B. The delay provided by the time delay circuit 70 is included to assure that the coil FC is deenergized and the coil RC is energized and vice versa, during a plugging operation of the circuit. The conducting rectifier SCR-3 and the closed switch contacts FS cause the coil winding FC to be energized so that the normally open contacts F1 close and the normally closed contact F2 open and complete a circuit through the armature ARM and field winding F to operate the motor M in a forward direction. Further, the conducting rectifier SCR-3 causes the removal of a control signal through the lead 12 to the sequencing circuit 60 which, after a time delay, e.g., 100milliseconds, removes the blocking signal through the lead 13 to the amplifier 40 so that the output of the amplifier 40 is controlled exclusively by the signals from the multivibrator 20. Additionally, the removal of the control signal via lead 12 causes the sequencing circuit 60 to remove blocking signals to the control circuit 30 via a lead 15. The delay provided by the sequencing circuit 60 eliminates the effects of contact bounce of the contacts F1 and R1 on the remainder of the circuits and assures that after the contacts F1 or R1 are closed, firing signals will be supplied to the rectifier SCR-2 before the amplifier 40 supplies a firing pulse to the rectifier SCR-1.

The removal of the signal via the lead 15 permits the control 30 to supply a control signal voltage through a lead 32 which will control the energization of the motor M in response to the adjustment of the speed controlling adjustable resistor P. The control 30 provides a controlled voltage signal through the lead 32 which will cause the motor M to initially rotate at an adjustable minimum creep speed which increases at a substantially linear adjustable rate to a value determined by the adjustment of the adjustable resistor P. The multivibrator 20 is arranged to automatically switch to an OFF state and be switched to an ON state in response to a signal from the clock 10. The output signal from the control 30 determines the time interval required for the multivibrator 20 to automatically switch to an OFF state after it has been switched to an ON state. When the multivibrator 20 switches to an ON state it supplies a signal through a lead 17 which causes the amplifier 40 to supply a signal through the lead 14 to the gate of the rectifier SCR-1 which switches the rectifier SCR-1 into a conductive state. Similarly, when the multivibrator 20 switches to an OFF state, it supplies a signal through a lead 18 which causes the amplifier 50 to supply a signal through a lead 16 to the gate electrode of the rectifier SCR-2 which switches the rectifier SCR-2 into a conductive state.

The switching of the rectifier SCR-1 to a conductive state completes an energizing circuit for the armature ARM and the field F from the battery B which includes the lead 22, the armature ARM, the closed contacts F1, the field F, the closed contacts R2, a primary winding TP of a transformer 21, the conducting controlled rectifier SCR-1 and the lead 23. The rectifier SCR-1 remains conducting after the firing signal to its gate electrode is removed as it is connected across a direct current source supplied by the battery B. A secondary winding TS of the transformer 21, in response to the current flow in the primary winding TP, provides an output current which is conducted by a diode D1 in a direction to charge a capacitor C1 making the side of the capacitor C1 which is connected to the anode of the rectifier SCR-2 positive in polarity. The charging current path for the capacitor C1 includes an inductor I and the conducting rectifier SCR-1. The output of the transformer secondary winding TS ceases when the iron core of the transformer 21 saturates. A short time interval after the rectifier SCR-1 has switched to a conductive state, the multivibrator 20 switches to an OFF state and supplies a signal through the lead 18 which causes the amplifier 50 to supply a signal through the lead 16 which causes the rectifier SCR-2 to switch to a conductive state.

The conducting rectifier SCR-2 completes a discharge path for the capacitor C1 which discharges through the rectifier SCR-2 and causes the rectifier SCR-1 to switch to a nonconductive state. After the rectifier SCR-1 is switched to a nonconducting state, any charge remaining on the capacitor C1 is discharged through the energizing circuit for the armature ARM and field F. The clock 10 and the speed and acceleration control 30 are arranged to supply input signals to the multivibrator 20 which will cause the multivibrator to periodically switch to an ON state at a constant frequency and to switch from an ON state to an OFF state an adjustable time interval after it has switched to an ON state. Thus the motor field F and the armature ARM windings will be energized by pulses of current of varying width dependent upon the output signal from the control 30.

The circuit also includes a plurality of diodes D2, D3, D4 and D5. The diode D2 conducts during the intervals between the pulses of current to the motor M because of the inductive nature of the armature and field windings of the motor. The diode D3 conducts during plugging operation of the motor M when the motor acts as a generator. The diodes D4 and D5 prevent the coil windings FC and RC from being simultaneously energized when the respective switch contacts RS and FS are closed.

Movement of the master switch to a position requiring maximum speed of the motor M will cause switch contacts SCS to close and a signal to be supplied through a lead 24 to a time delay circuit 80. The time delay circuit 80 is programmed to respond to the input signal from the lead 24 and after a predetermined time delay, which is greater than the adjustable rate of increase of the control 30, supply a firing signal which switches a silicon controlled rectifier SCR-4 to a conductive state. The conducting rectifier SCR-4 causes a coil SC of a shorting contactor to be energized which responds and closes a pair of contacts SC-1 so that the field F and armature ARM are connected directly across the battery B in shunt with the circuit including the rectifiers SCR-1 and SCR-2. When the rectifier SCR-4 switches to a conductive state, the potential at a junction 25 located between the coil SC and the anode of the rectifier SCR-4, approaches the potential at the lead 23 that is connected to the negative terminal of the battery B. The change in potential at the junction 25 is transmitted through a lead 26 to the sequencing circuit 60 which in response thereto supplies a signal through the lead 19 to a malfunction circuit detector 90 which will prevent operation of the malfunction detector, a signal through the lead 15 to the control circuit 30, which reprograms the circuit within control 30 so that the signals through the lead 32 will cause the multivibrator 20 to operate with minimum width ON pulses and a signal via the lead 13 to the amplifier 40 which prevents the amplifier 40 from supplying firing signals to the rectifier SCR-1.

The circuit also includes an arrangement for limiting the severity of plugging currents when the direction of travel of the vehicle is reversed. The most severe plugging current conditions will occur when the vehicle is moving with maximum speed in one direction and the master switch is operated to cause the vehicle to operate with maximum speed in the reverse direction. Assuming the master switch is positioned to cause operation of the vehicle in a maximum forward direction, the following conditions will prevail. The switch contacts FS and SCS will be closed so that the coils FC and SC are energized and contacts F1 and SC-1 are closed and the contacts F2 are open so that the armature ARM and field F are directly connected across the battery B. The initial operation of the master switch will open the switch contacts SCS while the switch contacts FS remain closed. The opening of the switch contacts SCS causes the coil SC to be deenergized so that the contacts SC-1 open and the control of the current flow through the armature ARM and field F is returned to the controlled conduction of the rectifiers SCR-1 and SCR-2. As was previously described, when the rectifier SCR-4 initially was switched to a conductive state, the potential at the junction 25 approaches the potential at a lead 23. When the switch contacts SCS open, the potential at the junction 25 becomes the positive potential of lead 22. The change to a positive potential at the junction 25 is transmitted through the lead 26 to the sequencing circuit 60 which in response thereto removes the blocking signal through the lead 19 to the malfunction detector circuit 90, removes a signal through the lead 15 to the control 30, which previously reprogrammed the control circuit 30 so that the motor M will operate at minimum speed, and removes a signal via the lead 13 to the amplifier 40 which prevented the amplifier 40 from supplying firing signals to the rectifier SCR-1.

The sequence circuit 60 is arranged, when the blocking signal from the lead 26 is removed, to provide a slight time delay before removing the signals through the leads 19, 13 and 15 which restores the operation of the malfunction detector 90, the amplifier 40 and the control 30 so that for a brief time interval the motor M will coast as the motor M acts as a generator and causes current to circulate through the diode D2. As the master switch is moved through a neutral position to operate the vehicle in a reverse direction, the switch contacts FS open and the switch contacts RS close. The opening of the switch contacts FS interrupts the energizing circuit for the coil FC so that the contacts F1 open and the contacts F2 close whereby the anode circuit for the rectifier SCR-3 is interrupted so the rectifier SCR-3 switches to a nonconductive state. The closing of the switch contacts RS completes a circuit through the coil RC to the anode of the rectifier SCR-3 and to the time delay circuit 70 which after a time interval provides a firing pulse to the gate electrode of the rectifier SCR-3 which switches into a conductive state. The conducting rectifier SCR-3 causes the coil RC to be energized so that the contacts R1 close and contacts R2 open.

The circuit is thus conditioned to energize the motor M with pulses of plugging current, as caused by the pulsed conduction of the rectifier SCR-1, to cause the motor M to operate in the reverse direction while the vehicle is moving in a forward direction. During plugging, a counter EMF appears across the armature ARM and the diode D3, which causes the diode D3 to conduct current and cause the polarity at a junction 28 to become positive relative to the lead 22. The voltage drop across the diode D3 is supplied as an input to a plugging control circuit 100 which responds thereto and supplies an output signal to a lead 29. The signal from the lead 29 as supplied to the time delay circuit 80 prevents the rectifier SCR-4 from conducting and thus the shorting contactor coil SC from being energized. The signal from the lead 29 as supplied to the clock 10 causes the clock 10 to decrease the frequency of its output pulses so that the !ON pulses as caused by the pulses conduction of the rectifier SCR-1 are spaced further apart. Finally the signal as supplied by the lead 29 to the control 30 causes the control 30 to provide an output signal to the multivibrator 20 which causes the conduction intervals of the rectifier SCR-1 to be minimal so the motor M will be energized for operation less than minimum speed.

The gradual decrease in the counter EMF as he vehicle approaches a stop, is reflected in a decrease in positive potential at the junction 28. The plugging control 100 in response to the decreasing positive potential at the junction 28 decreases the signal to lead 29 which permits the clock 10 to increase the frequency of its output pulses, the control 30 to increase the intensity of its output signal via lead 32 so the conduction intervals of the rectifier SCR-1 are increased and the time delay circuit 80 to be conditioned for operation to switch the rectifier SCR-4 to a conductive state should the switch contacts SCS be closed to cause the shorting contactor to be energized for maximum motor energization in the reverse direction.

The foregoing constitutes a general description of a motor control circuit as may be used with the circuitry for detecting malfunctions within the circuit as will now be described.

The sequence circuit 60 includes a plurality of transistors T1, T2 and T3, a capacitor C2, load resistors each designated by the letter R, diodes D6, D7, D8 and D9, Zener type diodes D10 and D11 and a silicon controlled rectifier SCR-5. The transistors T1, T2 and T3 are of the NPN type and each have their collector electrodes connected through a load resistor R to a lead 33 which is connected to the lead 22 and an emitter electrode connected through a lead 34 directly to the lead 23. The transistor T1 has its base electrode connected through the Zener diode D10, the diode D7, a load resistor R to a junction 35 which in turn is connected through a load resistor R to the lead 33 and to anode of the rectifier SCR-5. The cathode of the rectifier SCR-5 is connected through the diode D8 to the lead 12. The transistor T2 has its base electrode connected through the Zener diode D11 to a junction 36 which in turn is connected through the capacitor C2 to the lead 34 and through the diode D9 and the lead 26 to the junction 25. The junction 36 is also connected to the collector electrode of the transistor T1. The transistor T3 has its base electrode connected through a junction 37 to the collector electrode of the transistor T2. The junction 37 is connected through a load resistor and the diode D6 to supply the lead 15 with a signal indicative of the conducting state of the transistor T2. The junction 37 is also connected through a load resistor R, the lead 19 and a diode d12 to supply the malfunction detector circuitry 90 with a signal that is indicative of the conductive state of the transistor T2. The collector electrode of the transistor T3 is connected through the lead 13 to supply a signal indicative of the conducting state of the transistor T3 to the amplifier 40.

The time delay circuit 70 includes a capacitor C3, a silicon unilateral-type switch SUS and resistors R1, R2, R3 and R4. The capacitor C3 is connected between the lead 23 and a junction 38 which is connected through the resistor R1 to the anode of the rectifier SCR-3 and through the switch SUS to a junction 39. The junction 39 in turn is connected through the resistor R2 to the gate electrode of the rectifier SCR-3 and through the resistor R3 to the gate electrode of the rectifier SCR-5. The resistors R2 and R4 are connected in series between the lead 23 and the junction 39.

The malfunction detector circuit 90 includes a capacitor C4, a transistor T4, a unijunction transistor T5, a silicon controlled rectifier SCR-6, a Zener diode D13, resistors R5, R6, R7, R8 and R9, a capacitor C5 and diodes D14 and D15. The transistor T4 has a base electrode connected to a junction 41 which in turn is connected through the diode D14 to the lead 23 and through the diode D12 and the lead 19 to receive signals appearing at the junction 37. The junction 41 is also connected through the resistor R5 and the Zener diode D13 to the anode of the rectifier SCR-1. The collector electrode of the transistor T4 is connected through the resistor R6 to the lead 22 and through the capacitor C4 to the lead 23. The side of the capacitor C4 which is connected to the collector electrode of the transistor T4 is also connected to the emitter electrode of the transistor T5. The emitter electrode of the transistor T4 is directly connected to the lead 23. The transistor T5 has its base two electrode B2 connected through the resistor R7 to the lead 22 and its base one electrode B1 connected through the resistor R8 to the lead 23 with a junction 42 located between the base one electrode B1 and the resistor R8 connected to the gate electrode of the rectifier SCR-6. The rectifier SCR-6 has its cathode connected to the lead 23 and its anode connected through the resistor R9 to the lead 22. The capacitor C5 is connected between the anodes of the rectifiers SCR-3 and SCR-6 and the diode D15 is connected between the anode of the rectifier SCR-6 and the junction 38 in the time delay circuit 70.

Prior to the closure of switch contacts FS or RS, diode D8 and the rectifier SCR-5 will be nonconducting, causing a positive potential to be present at the junction 35. The positive potential at the junction 35 overcomes the blocking ability of the Zener diode D10 and biases the transistor R1 into a conductive state so as to complete a discharge circuit for the capacitor C2 that includes the junction 36 and the collector to the emitter of the transistor T1. Also, the conducting transistor T1 and the discharged capacitor C2 causes the transistor T2 to be nonconductive which causes a positive potential to be present at the junction 37. The positive potential at the junction 37, as transmitted via the lead 19 and the diode D12 to the base of the transistor T4, biases the transistor T4 into conduction. Also, the positive potential at the junction 37 biases the transistor T3 into conduction so that the lead 13 is not furnished with a signal which will permit the amplifier 40 to supply firing signals to the rectifier SCR-1. And finally, the positive potential as transmitted via the diode D6 and the lead 15, programs the circuit within the speed control circuit 30 so that the multivibrator 20 will supply the amplifier 40 with minimum width ON pulses.

The closure of either of the switch contacts FS or RS prior to the switching of the rectifier SCR-3 to a conductive state causes the positive potential at lead 22 to be impressed on the anode of the rectifier SCR-3. The positive potential on the anode of the rectifier SCR-3 causes the capacitor C3 to charge through the resistor R1 in a direction to cause the junction 38 to have an increasing positive potential. After a brief time delay, the positive potential at the junction 38 rises to a value which exceeds the blocking ability of the switch SUS and the switch SUS conducts and causes a positive polarity signal to appear at the junction 39. The positive polarity signal at the junction 39 is transmitted through the resistor R2 to the gate electrode of the rectifier SCR-3 which causes the rectifier SCR-3 to switch to a conductive state and the coil FC to be energized if the switch FS was initially closed to operate the motor M in the forward direction. Further, the conducting rectifier SCR-3 causes the capacitor C5 to be charged in a direction so that the side of the capacitor C5 connected to the anode of the rectifier SCR-6 has a positive polarity and completes the cathode circuit for the rectifier SCR-5. The positive potential at the junction 39 is also supplied through the resistor R3 to the gate electrode of the rectifier SCR-5. The rectifier SCR-5, in response to the positive polarity signal at its gate electrode and its completed cathode circuit through conducting rectifier SCR-3, switches to a conductive state and conducts current through a circuit that includes the lead 33, the resistor R, the junction 35, the rectifier SCR-5, the diode D8, the lead 12, diode D4, the switch FS and the rectifier SCR-3.

The conducting rectifier SCR-5 reduces the positive potential at the junction 35 to a value which permits the Zener diode D10 to block current to the base electrode of the transistor T1 and the transistor T1 switches to a nonconductive state so that the capacitor C2 begins to charge through the collector resistor R of the transistor T1 in a direction to increase the positive potential at the junction 36. After a brief time interval, the transistor T2 switches to a conductive state when the positive potential at the junction 36 exceeds the blocking ability of the Zener diode D11 and removes the positive polarity signal at the junction 37. The removal of the positive polarity signal at the junction 37 permits the conduction of the transistor T4 to be controlled in a manner hereinafter described and the speed control 30 to respond to the adjustment of the potentiometer resistor P. Further, the removed positive polarity signal at the junction 37 causes the transistor T3 to switch to a nonconductive state and supply a voltage signal through the lead 13 to the amplifier 40 which switches the amplifier 40 so it will respond to signals from the multivibrator 20 to switch the rectifier SCR-1 to a conductive state.

One of the modes of failure possible in the circuit shown is that the control rectifier SCR-1 when switched to a conductive state, becomes incapable of being commutated to a nonconductive state by the charge on the capacitor C1. When this type of failure occurs, the motor M will be energized by uncontrolled current. The malfunction detector 90 is provided in the circuit to detect this type of failure and render the circuit inoperative upon the occurrence of this type of failure. The malfunction detector circuit 90 operates as follows. Each time the rectifier SCR-1 switches to a conductive state, the potential at a junction 43 which is connected to the anode of the rectifier SCR-1 decreases from the positive potential of the lead 22 and approaches the potential of lead 23. The signal change from a positive to an essentially zero potential at the junction 43 is transmitted via a lead 44 to the malfunction detector 90. The positive potential present at the junction 43 is sufficient to overcome the blocking ability of the Zener diode D13 and bias the transistor T4 into conduction and discharge the timing capacitor C4. The presence of a zero potential at the junction 43 will permit the Zener diode D13 to resume its blocking ability so that the transistor T4 switches to a nonconductive state and the capacitor C4 begins to charge through the resistor R6 in a direction making the side of the capacitor C4 that is connected to the emitter of the unijunction transistor T5 positive in polarity. Thus each time the potential at the junction 43 becomes positive, the lead 44 supplies a signal to the malfunction detector 90 which resets the timing circuit within the malfunction detector 90. The timing period of the timing circuit including the RC constants of the resistor R6 and the capacitor C4, is arranged to exceed the spaced time intervals between signals supplied by the clock 10. Thus if the controlled rectifier SCR-1 is not switched to a nonconductive state after a predetermined time interval, the capacitor C4 will be charged to a voltage which will cause the transistor T5 to switch to a conductive state and supply a firing signal through the junction 42 to the gate of the rectifier SCR-6 which in response thereto switches to a conductive state. The rectifier SCR-6 upon being switched to a conductive state, remains in the conductive state as it is connected through the resistor R9 across a DC supply. The switching to a conductive state of the rectifier SCR-6 provides a discharge path for the charge on the capacitor C5 and causes the charge present on the capacitor C5 to be discharged through the conducting rectifier SCR-3 in a reverse direction to the current flow through the rectifier SCR-3. The discharge current from the capacitor C5 causes the rectifier SCR-3 to switch to a nonconductive state so that the coil FC becomes deenergized. The deenergization of the coil FC causes the contacts F1 to open and the contacts F2 to close so that the circuit to the motor field F and the armature ARM, as well as the circuit to the anode of the rectifier SCR-1, is interrupted. The interrupted circuit to the anode of the rectifier SCR-1 causes the rectifier SCR-1 to switch to a nonconductive state. Further, when the rectifier SCR-6 conducts, its anode potential approaches the potential of the lead 23. This arrangement permits the diode D15 to conduct current from the junction 38 within time delay circuit 70 and prevents the time delay circuit 70 from supplying firing pulses to the rectifier SCR-3 so that the coils FC remain deenergized as long as the rectifier SCR-6 remains conducting. Further, in event the rectifier SCR-2 is incapable of being switch to a conductive state or is not switched to a conductive state within a predetermined time interval after the rectifier SCR-1 has switched to a conductive state, the malfunction detector circuitry 90 will cause the rectifier SCR-3 to switch to a nonconductive state in the same manner as previously described when the rectifier SCR-1 was incapable of being switched to a nonconductive state. After a malfunction as above described has occurred, the rectifier SCR-6 will remain in a conductive state and the sequence circuit 60 will be programmed to prevent firing pulses from being delivered to the rectifier SCR-1. The control is restored to its normal operating condition by opening of a switch S which acts as a reset switch and is included in the circuit to disconnect the battery B from the remaining circuits as shown in the drawing. When the switch S is opened, the rectifier SCR-6 switches to a nonconductive state. Reclosure of the switch S reconditions the circuits for operation in a manner as heretofore described.

Another possible malfunction which may occur is the failure of the contacts SC-1 to open after the coil SC is deenergized, as may be experienced when the contacts SC-1 become welded together. As was previously stated, a closure of the switch contacts SCS will cause the rectifier SCR-4 to switch to a conductive state and the coil winding SC to be energized. The energized coil SC causes the closure of the contacts SC-1. The circuit is thus conditioned for energizing the motor with maximum current. Further, when the coil winding SC is energized, the potential at the junction 25 decreases to the potential of the lead 23 so that the transistor T2 switches from a conductive to a nonconductive state and causes a positive potential to appear at the junction 37. The positive potential at the junction 37 is transmitted via the lead 19 and the diode D12 to the base of the transistor T4, which in response thereto switches to a conductive state and completes a discharge circuit for the capacitor C4. Thus during periods when the contacts SC-1 and the switch contacts SCS are closed, the malfunction detector 90 is rendered inoperative.

When it is desired to reduce the speed of the motor from a maximum, the switch contacts SCS are opened to deenergize the coil SC. In the event that the contacts SC-1 remain closed after the coil SC is deenergized, the circuit will respond in detecting the malfunction as follows. The open switch contacts SCS will cause the potential at the junction 25 to appear as a positive potential which, together with the charge on capacitor C2, causes the transistor T2 to switch to a conductive state. The conducting transistor T2 causes the potential at the junction 37 to approach the potential of lead 23 and terminates the blocking signal through the lead 19 and the diode D12 and thus restores the operation of the malfunction circuit 90. Similarly, the closed contacts SC-1 will cause the potential at the junction 43 to be maintained at the potential of lead 23 so that the capacitor C4 charges to a value which will switch the transistor T5 into a conductive state. The conducting transistor T5 causes the rectifier SCR-6 to switch to a conductive state and the rectifier SCR-3 to switch to a nonconductive state to deenergize the coil winding FC which will cause the opening of the contacts F1 and the deenergization of the motor in a manner previously described.

Another possible type of malfunction of the circuit will occur if the rectifier SCR-3 has failed in a conducting mode of operation or is incapable of being maintained in a nonconducting state after the rectifier SCR-6 has been switched to a conducting state. When this type of malfunction occurs, the coils FC or RC will remain energized and maintain the directional contacts F1 or R1 closed in event the rectifier SCR-1 is not switched to a nonconducting state within a predetermined time interval after it has been switched to a conducting state.

A failure of a silicon controlled rectifier in a conducting mode results in the rectifier automatically switching into a conducting state without being switched to a conducting state by a suitable signal between its gate and cathode electrodes. Thus in event the rectifier SCR-3 has failed in a conducting mode and either of the switches FS or RS are closed, the malfunction detector circuit 90 will be incapable of switching the rectifier SCR-3 to a nonconducting state for the purpose of deenergizing the coils FC or RC and opening the contacts F1 or R1 during period when the switch contacts FS or RS are closed. Thus should the malfunction involving the rectifier SCR-1 occur during a period when the rectifier SCR-3 has failed in a conducting mode, the contacts F1 or R1 will not open to deenergize the motor M as previously described.

The closure of either of the switch contacts FS or RS when the rectifier SCR-3 has failed in a conducting mode will result in the rectifier SCR-3 immediately conducting current so that the coils FC or RC become energized. Thus the contacts F1 or R1 will close and the potential at the anode of the rectifier SCR-3 will be approximately the potential of the lead 23 and the capacitor C3 in the time delay circuit 70 will not be charged. The failure of the capacitor C3 to receive a charge will prevent a firing current from being delivered through the switch SUS, the junction 39, and the resistor R3 to the gate electrode of the rectifier SCR-5 so the rectifier SCR-5 will not switch to a conductive state even though the rectifier SCR-3 is conducting. The failure of the rectifier SCR-5 to switch to a conductive state will cause the transistor T1 to remain in a conductive state so the capacitor C2 remains discharged and the transistor T2 remains in a nonconducting state while the transistor T3 remains in a conducting state. The conducting state of the transistor T3 prevents a signal from being delivered through the lead 13 which will permit the amplifier 40 to respond to the ON signal pulses from the multivibrator 20 and thus prevents the amplifier 40 from supplying signals through the lead 14 which will switch the rectifier SCR-1 into a conductive state.

The constructional details of the speed control circuit 30 will be readily understood to those skilled in the art. However, if further understanding thereof is required, the details thereof are clearly set forth in an application Ser. No. 813,535, which was filed by the inventor Philip H. Rusch concurrently herewith.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

We claim:

1. A control system for a direct current motor comprising: a direct current source, a direct current motor, a first circuit including a set of normally open contacts and a first silicon controlled rectifier connected in a series circuit between the source and the motor, a second circuit including a second controlled rectifier and means for maintaining the contacts in a circuit closing position during conductive intervals of the second rectifier and for opening the contacts when the second rectifier is nonconductive, a third circuit means for alternately switching the first rectifier to a conductive and a nonconductive state at a predetermined rate for supplying the motor with spaced pulses of current when the contacts are in a circuit closing position, said current pulses each having a predetermined time duration, a fourth circuit including means for detecting the time duration of current flow through the first circuit and means for switching the second rectifier to a nonconductive state when the duration of current flow through the circuit exceeds a time interval that is greater than the maximum predetermined time duration of the current pulses, and a fifth circuit including means for preventing the third circuit from switching the first rectifier to a conductive state in event the fourth circuit is incapable of switching the second rectifier to a nonconductive state.

2. A control system for a direct current motor comprising: a direct current source, a direct current motor, a first circuit including a first set of normally open contacts and a first silicon controlled rectifier connected in a series circuit between the source and the motor, a second circuit including a second set of normally open contacts connected in a series circuit with the first set of contacts and in a parallel circuit with the first rectifier between the source and the motor, a third circuit including a second silicon controlled rectifier and means for maintaining the first set of contacts in a circuit closing position during conductive intervals of the second rectifier, a fourth circuit including means for maintaining the second set of contacts in a circuit closing position when the fourth circuit is energized and for moving the second set of contacts to a circuit opening position when the fourth circuit is deenergized, a fifth circuit means for alternately switching the first rectifier to a conductive and a nonconductive state at a predetermined rate for supplying the motor with spaced pulses of current when the first set of contacts are in a circuit closing position and the fourth circuit is deenergized, said current pulses each having a predetermined time duration, and a sixth circuit including means inoperative when the fourth circuit is energized and responsive when the fourth circuit is deenergized for detecting the time duration of current flow through the first circuit and the second circuit and means for switching the second rectifier to a nonconductive state when the duration of current flow through the first or the second circuits exceeds a time interval that is greater than the maximum predetermined time duration of the current pulses.

3. The control system as recited in claim 2 including means for preventing the fifth circuit from switching the first rectifier to a conductive state in event the sixth circuit is incapable of switching the second rectifier to a nonconductive state.

4. The control system as recited in claim 2 wherein the fourth circuit includes a third silicon controlled rectifier and magnet coil which maintains the second set of contacts in the closed circuit position when the third rectifier is conducting.

5. The control system as recited in claim 2 wherein the means for switching the second rectifier to a nonconductive state includes a third silicon controlled rectifier and a capacitor that is charged when the second rectifier is conducting and discharged when the third rectifier is switched to a conductive state.

6. The control system as recited in claim 5 wherein the capacitor is connected between the anodes of the second and the third rectifiers and the third rectifier is connected across the battery through a reset switch whereby the third rectifier when conducting prevents the second rectifier from switching to a conductive state.

7. The control system as recited in claim 3 wherein the means for preventing the fifth circuit from switching the first rectifier to a conductive state includes a third silicon controlled rectifier and a common circuit for switching the third and the second rectifiers into a conductive state.

8. The control system as recited in claim 7 wherein the common circuit is incapable of switching the third rectifier to a conductive state when the sixth circuit is incapable of switching the second rectifier to a nonconductive state.

9. The control system as recited in claim 2 wherein the means for detecting the time duration of current flow through the first circuit includes a capacitor having a charging circuit controlled by a potential appearing at the anode of the first rectifier.

10. The control system as recited in claim 9 wherein the means for detecting the time duration of current flow through the first circuit includes the capacitor, a charging circuit for the capacitor connected to anode of the first rectifier so the capacitor is charged by pulses of current to a value depending on the duration of the pulses and a unijunction transistor connected to the capacitor to supply a an output signal when the value of the charge on the capacitor exceeds a predetermined value.